United States Patent [19]

Tylaska

[11] Patent Number: 5,195,223
[45] Date of Patent: Mar. 23, 1993

[54] QUICK RELEASE APPARATUS

[76] Inventor: Timothy T. Tylaska, 138 N. Stonington Rd., Mystic, Conn. 06355

[21] Appl. No.: 717,387

[22] Filed: Jun. 19, 1991

[51] Int. Cl.$^5$ .............................................. A44B 11/00
[52] U.S. Cl. ........................................ 24/602; 24/607; 24/609
[58] Field of Search ................ 24/602, 604, 605, 606, 24/607, 608, 609, 610, 611, 612, 630, 631, 629, 700

[56]  References Cited

U.S. PATENT DOCUMENTS

| | | | |
|---|---|---|---|
| 1,370,850 | 3/1921 | Sieverling | 24/609 |
| 2,142,925 | 1/1939 | Tripp | 24/607 |
| 3,145,042 | 8/1964 | Bendl | 24/602 |
| 3,600,760 | 8/1971 | Eshleman | 24/602 |
| 3,628,222 | 12/1971 | Palen | 24/607 |
| 4,226,589 | 10/1980 | Klein | 24/602 |
| 4,612,687 | 9/1986 | Barwood | 24/602 |

FOREIGN PATENT DOCUMENTS 0690896  4/1953  United Kingdom ................ 24/602

Primary Examiner—Victor N. Sakran
Attorney, Agent, or Firm—William B. Ritchie

[57] ABSTRACT

A quick release mechanism for releasing two members joined together under tension. The force necessary to release the mechanism is substantially independent of the tension being carried by the device. This is accomplished by providing a contact surface between the latch and its holder such that the moment necessary to release the latch holder must not increase with frictional force or normal force at the point of contact between the latch and latch holder. An equation that provides the configuration necessary to achieve this objective is derived which yields a logarithmic spiral solution set. The spiral expands from zero to infinity, with any portion of the curve being a valid solution to the curve that must machined into either a latch holder surface or a latch surface. The invention may also be used to provide a mechanism that will release once a pre-determined tension has been obtained, i.e., a reusable "week link" or the inverse "weak link", i.e. will release when tension has been decreased by a certain amount.

14 Claims, 3 Drawing Sheets

QUICK RELEASE APPARATUS

BACKGROUND OF THE INVENTION

1. Field of the Invention

The invention relates to quick release mechanisms for joining two members under tension.

2. Description of the Related Art

There are numerous situations where it is desirable to have a fast reliable means for releasing two members joined together under tension. Releasing gliders from tow airplanes, releasing barges from tugboats, sails or spinnakers from sailboats, are just a few of the many places where this need is encountered. There are equally as many applications where it is desirable to have two members under tension release when the tension force reaches a preselected level. Thus, the mechanism in this case would be functioning as a "weak link", such as that required in a ski boot binding mechanism. Moreover, it is highly desirable that normal wear and tear of the mechanism not appreciably effect the releasing characteristics of the device within the useful life span of the apparatus.

Various mechanisms have been designed for sailboat rigging to release two members joined together. The simplest is the so-called "pelican" fitting (named for its appearance) which is particularly difficult to release once under strong tension. The Wichard Company of France has improved upon that simple design by providing a swivel point of attachment for one line and a spring released locking bar to unlatch the other member. However, when this device is under heavy tension, a lanyard must be attached to the locking bar in order to be able to apply sufficient force to release the mechanism.

U.S. Pat. No. 4,944,074, issued to Bullat et al. on Jul. 31, 1990, discloses a quick release mechanism that is designed to release when a predetermined tension is exerted between two members. This device works by having a sphere, which is attached to one member, pull free from a cylindrical spring housing, which is attached to the other member, when the desired tension force is reached. The force required to release the sphere is a function of the slits designed into the cylindrical spring housing as well as materials used in construction of the housing and sphere. Reloading after release requires releasing the sphere from its member and re-inserting the sphere within the housing or threading the member through the housing until the sphere is properly seated. Either method is inconvenient. Also, this device does not disclose a mechanism that can be adapted to be released by hand.

SUMMARY OF THE INVENTION

It is an object of the invention to provide a mechanical quick release apparatus which has a constant required triggering force, regardless of the tension being constrained.

Another object of the invention is to provide a mechanical quick release apparatus which has a triggering force that increases at a desired rate with tension being constrained.

Still another object is to provide a mechanical release apparatus which will trigger automatically when a desired load is reached and acts as a reusable "weak link".

Yet another object is to provide a mechanical release apparatus which can be conveniently reloaded by pushing on the latch cam only.

Still another object is to provide a mechanical release apparatus that has a wear characteristic of sliding components such that the wear of the components follows a solution curve and therefore makes the proper operation of the device independent of wear.

A final object of the invention is to provide a mechanical quick release apparatus which can be manufactured from a variety of materials for a variety of applications yet still achieve a predictable release force regardless of the tension force being exerted upon it.

DETAILED DESCRIPTION OF THE INVENTION

Figure 1:
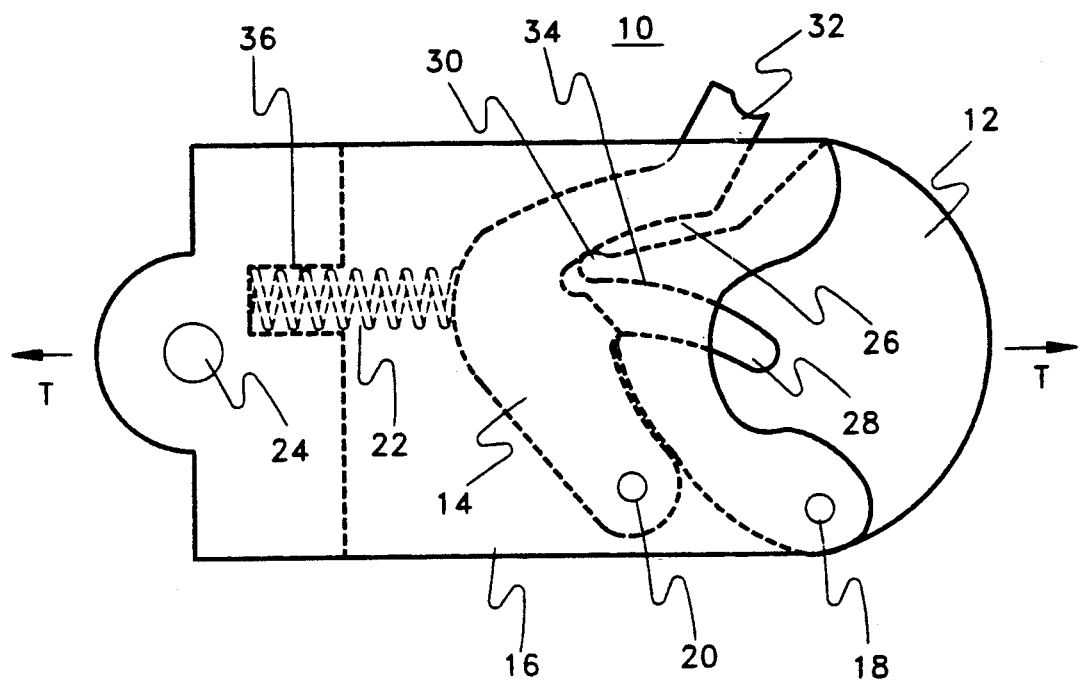
FIG. 1 is a side view of the quick release mechanism in accordance with the invention.

The most basic configuration of the quick release apparatus according to the invention comprises a latch bar, a latch holder bar, a ground bar and a spring. The apparatus also has one sliding surface and two pinned revolute joints. The most basic configuration, shown in FIG. 1, is suitable for quickly releasing a towing cable or a sailboat line or other similar uses which places two members under tension. The sizes presented herein are preferable for use in a sailboat application as will be described later. Other applications will require corresponding dimensions changes in accordance with the invention.

One member is fastened through anchor point 24 in ground bar 16. Ground bar 16 is approximately 2 inches long, ¾ inches wide and ½ inch thick. The other member is fastened around latch bar 12 in the region of anchor point 28. When using a nonrigid item such as a rope or cable, it is preferable that a shackle be passed around latch bar 12 to prevent chaffing and provide a rigid sliding surface. Tension T is then applied to the system. Invention 10 is held closed by the sliding surface friction developed between latch bar 12 and latch holder 14 at contact point 30 and along sliding surface 26 of latch holder 14. Invention 10 will hold latch bar 12 closed irrespective of tension T as a result of the shape of sliding surface 26. The release of the invention is primarily a function of spring 22. To release invention 10, the operator pushes on latch holder knob 32 which causes latch holder 14 to pivot via joint 20 towards anchor point 24, compressing spring 22 within spring pocket 36. A 7/64 inch hole (not shown) could be placed in holder knob 32 for attachment of trigger line to aid in releasing the invention 10. Spring 22 is preferably a ⅜ inches diameter coil spring. When the latch holder 14 has been slid completely over the latch bar 12, the device releases. Depending on the variation of the design, if the latch holder 14 is slid only part way over the latch bar 12 and then stopped, the mechanism will still hold the tension as normal. Latch bar 12 will pivot away via joint 18 from latch holder 14, causing the shackle fastened through anchor point 28 to slide free from invention 10 along release surface 34. Joints 18 and 20 are preferably ⅛ inch diameter steel pins.

Preferably, latch bar 12 and latch holder 14 are 3/16 thick chrome plated steel forging. The latch bar 12 and latch holder bar 14 are of a shape such that reloading of the device can be accomplished by pushing on latch bar 12 only. The cam-shaped configuration of the latch bar 12 causes the latch holder 14 to be forced backward during reloading and eventually snaps back in place.

Figure 2:
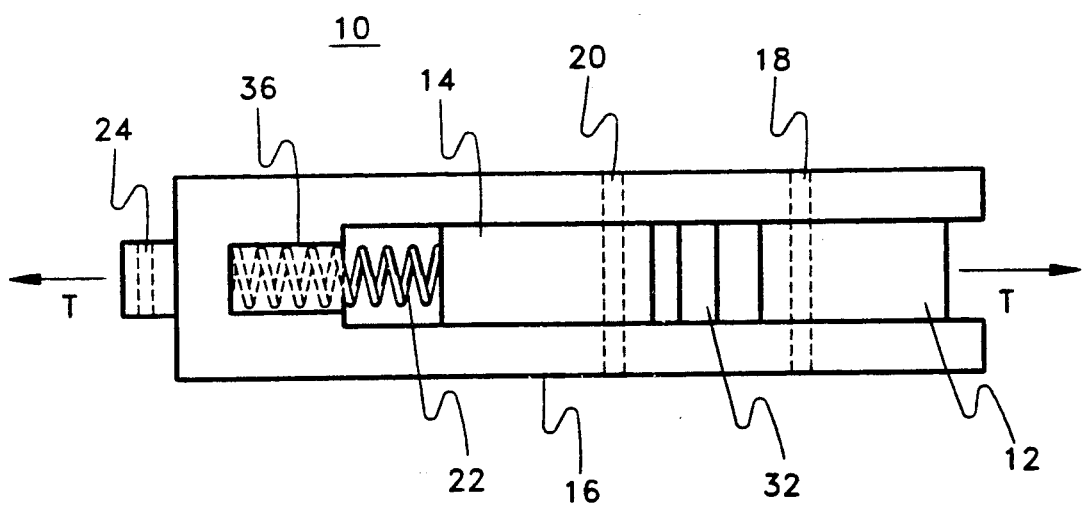
FIG. 2 is a top view of the quick release mechanism in accordance with the invention.

FIG. 2 is a top view of invention 10 showing latch holder 14 and latch bar 12 within ground bar 16.

Figure 4:
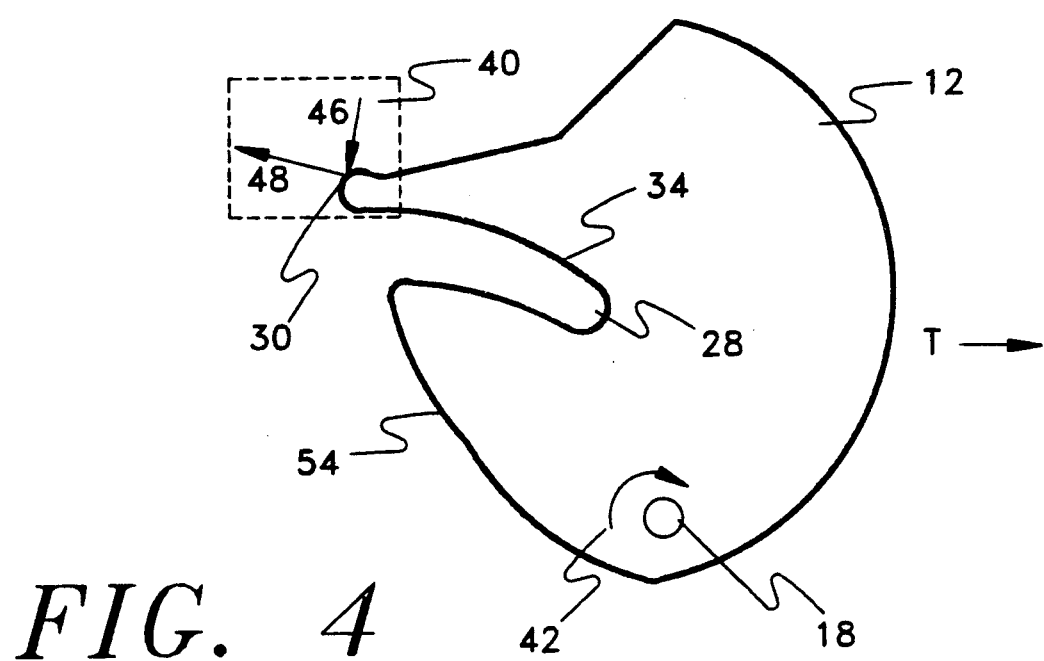
FIG. 4 is a side view of the latch bar in accordance with the invention.

FIG. 4 shows a side view of the latch bar 12. It can be seen that tension T applied to latch bar 12 results in both a force and a moment 42 about revolute joint 18. The force on the joint is constrained by the shear strength of the pin in revolute joint 18 and moment 42 is constrained by an interference with latch holder bar 14.

By drawing a control volume 38 and 40 around the point of contact of latch hold bar 14 with latch bar 12, respectively, it can be seen that the normal force 46 ($F_n$) and frictional force 48 ($F_f$) which act on the latch bar 12 also act equally and opposite on the latch holder bar 14. It is known by definition that the frictional force always acts perpendicular to the normal force.

Figure 3:
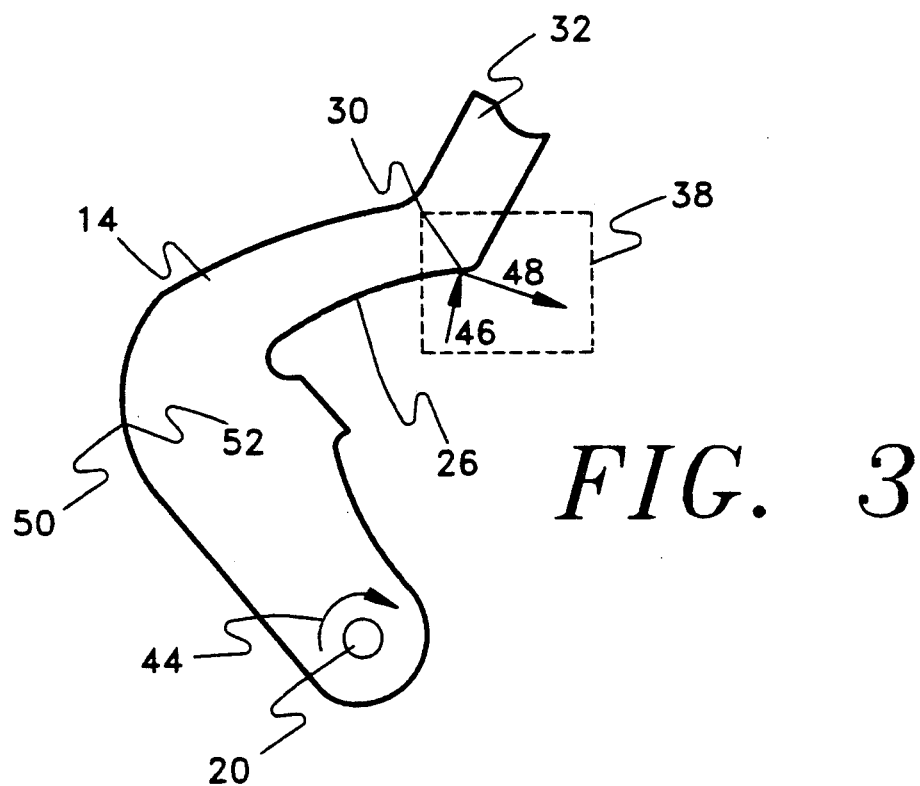
FIG. 3 is side view of the latch holder bar in accordance with the invention.

Referring to FIG. 3, we can now find the moment acting about revolute joint 20 by the use of vector cross products. Therefore, all forces and distances will be expressed as vectors and will be represented by a bold letter. First, a standard "i,j,k" three dimensional coordinate system will be placed on the latch holder 14 so that it rotates with this bar, and its origin lies directly on top of joint 20.

Next, a vector D can be defined to extend from revolute joint 20 to the intersection point of the latch bar and latch holder, i.e., contact point 30 in FIG. 1. A vector R can also be defined as extending from joint 20 to the point of contact 52 of the spring 22. By giving scaler forces $F_n$, $F_f$ and $F_s$ specific directions, they can be expressed as vector quantities.

Now, the moment about joint 20 can be expressed by using vector cross products of the various force and displacement vector quantities. The moment can be expressed as:

Moment about joint
$20 = (R \times F_s) + (D + F_N) + (D \times F_f)$     Eq. 1

It should be noted that by using vector notations, the signs of moments are accounted for in the vector algebra. It should also be noted that an additional moment is caused by bearing friction on the pin through joint 20, but this friction will be neglected for now. This bearing friction can be considered negligible for the preliminary analysis.

From equation 1, it can be seen that the moment about joint 20 consists of three terms. The first term is the force 50 exerted by the spring 22 which does not depend on Fn or Ff, while the other two terms in the equation do.

Therefore, the spring and spring distance parameters are free design choices for the designer and are not particularly critical to the design of the mechanism. The last two terms of the moment equation, however, are very critical to the proper operation of the device. It is desired that regardless of tension T, the moment required about joint 20 to slide the latch holder bar 14 must always be the same. Thus, the moment about joint 20 must not increase or decrease with a change in Fn and Ff. This can be done by constraining the (D×Fn) and (D×Ff) terms of equation 1 is to always equal zero. In this manner, the only moment required to slide the latch holder bar 14 open is that due to the spring 22, which is independent of any other forces. Neglecting the moment due to the spring 22, it is desired that: Moment about joint 20 = constrained to always equal zero $(D \times F_N) + (D \times F_f) = 0$ or $(D \times F_n) = -(D \times F_f)$     Eq. 2.

Now, it is required to express equations for vectors Fn and Ff. Vector Fn can be defined as a force of magnitude $|F_n| = F_n$ with a specific direction. The direction in which this force acts is perpendicular to a tangent line drawn through the point of contact 30 between the latch bar 12 and the latch holder bar 14.

Vectors Fn and Ff will be derived in terms of the equation of the tangent line $y = f(x)$ whose equation is derived next. By trigonometric definition, the slope of a line perpendicular to another line is equal to the negative reciprocal of the slope of the other line. Also, by elementary calculus, the slope of a line can be expressed as the first derivative of the line equation. Thus, the slope of a line perpendicular to another can be expressed as the negative reciprocal of the derivative of the other line equation. Let us assume that the equation of a tangent line is represented as "$y = f(x)$". The "tangent line" is the tangent drawn through the point of contact of the surfaces of the latch and latch holder. The vector representing the slope of this tangent line is given in component . e notation as shown below:

$$\text{Vector representing the tangent line} = \begin{bmatrix} 1 \\ y' \end{bmatrix}_j^i \quad \text{Eq. 3}$$

With respect to an "i,j,k" coordinate system, the first component of the vector is in the "i" direction and the second component is in the "j" direction. Equation 3, which represents the direction of the tangent line, can be normalized by dividing through by its magnitude, thus producing a vector of unit length as shown:

$$\text{Unit vector in direction of tangent line} = \begin{bmatrix} 1 \\ y' \end{bmatrix}_j^i \frac{1}{\sqrt{1 + (y')^2}} \quad \text{Eq. 4}$$

Since the slope of a line perpendicular to the tangent line is given as the negative reciprocal of the derivative, equation 5 represents the slope of the unit vector which is normal to the tangent line as shown:

$$\text{Unit vector in direction perpendicular to tangent line} = \quad \text{Eq. 5}$$

$$\begin{bmatrix} -y' \\ 1 \end{bmatrix}_j^i \sqrt{1 + (y')^2}$$

The vector Fn can now be expressed as the normal force scaler, Fn, multiplied by the unit direction vector that was given in equation 5.

$$F_n = F_n \begin{bmatrix} -y' \\ 1 \end{bmatrix}_j^i \frac{1}{\sqrt{1 + (y')^2}} \quad \text{Eq. 6}$$

The vector Ff can also be expressed in a similar manner by multiplying the frictional force scaler, Ff, by the unit direction vector from equation 4 to give equation 7.

$$F_y = F_y \begin{bmatrix} 1 \\ y' \end{bmatrix}_j^i \frac{1}{\sqrt{1 + (y')^2}} \qquad \text{Eq. 7}$$

For most loadings, the relation between the normal force, Fn, and the frictional force, Ff, is given by equation 8. The proportionality constant, $\mu$, is a non-dimensional quantity called the coefficient of friction.

$F_f = \mu F_n$ Where "$\mu$" equals the coefficient of friction  Eq. 8

Substituting equation 8 into equation 7 results in:

$$F_f = \mu F_n \begin{bmatrix} 1 \\ y' \end{bmatrix}_j^i \frac{1}{\sqrt{1 + (y')^2}} \qquad \text{Eq. 9}$$

An expression for the position vector D can also be obtained. Position vector D extends from the revolute joint 20 to the contact point 30 between the latch bar 12 and latch holder bar 14. Vector D could be expressed in "i j k" coordinates, but for convenience, an identical "x,y,z" coordinate system will be placed directly on top of the existing "i,j,k" system. Both systems are thus identical. The reason for using two identical coordinate systems is because cross product multiplication is traditionally done using the "i,j,k" system, while line equations are traditionally expressed using the "x,y,z" coordinates. Using the "x,y,z" system, vector D can be expressed in component form as:

$$\text{Position vector } D = \begin{bmatrix} x \\ y \end{bmatrix}_j^i \qquad \text{Eq. 10}$$

Expressions for all terms found in equation 2 have now been obtained, and substitutions can be made. Starting with the left side of equation 2, the cross product of the position vector D with vector Fn and can be expressed as shown:

$$DxF_n = \begin{bmatrix} x \\ y \end{bmatrix}_j^i \times \frac{F_n}{\sqrt{1 + (y')^2}} \begin{bmatrix} -y' \\ 1 \end{bmatrix}_j^i \qquad \text{Eq. 11}$$

The cross product multiplication can be done with the cross product rules shown below:

$i \times j = k \quad j \times k = i \quad k \times i = j$
$j \times i = -k \quad k \times j = -i \quad i \times k = -j$ The result of completing the cross product multiplication in equation 11 is given below in equation 12:

$$DxF_n = \frac{F_n}{\sqrt{1 + (y')^2}} [x + yy']k' \qquad \text{Eq. 12}$$

Again, equation 12 is equivalent to the left hand side of equation 2. In a similar manner, the right hand side of equation 2 can also be expressed in x,y coordinates by making the required substitutions. One term on the right hand side of equation 2 consists of the cross product of the position vector D with the frictional vector Ff. The expression is shown below:

$$-(DxF_f) = -\begin{bmatrix} x \\ y \end{bmatrix}_j^i \frac{\mu F_n}{\sqrt{1 + (y')^2}} \begin{bmatrix} 1 \\ y' \end{bmatrix}_j^i \qquad \text{Eq. 13}$$

The result of completing the cross product multiplication in equation 13 is shown below in equation 14.

$$-(DxF_n) = -\frac{\mu F_n}{\sqrt{1 + (y')^2}} [xy' - y]k' \qquad \text{Eq. 14}$$

Now recall from equation 2 that:

$(DxF_n) = -(DxF_f).$

By substituting equations 13 and 14 into equation 2, the resulting equation is given as:

$$\frac{F_n}{\sqrt{1 + (y')^2}} [x + yy']k = -\frac{\mu F_n}{\sqrt{1 + (y')^2}} [xy' - y]k'$$

From equation 15, it can be seen that the magnitude of the normal force, Fn, divided by the magnitude of the vector direction cancels from both sides of the equation. The vector direction "k" also cancels out. By simplifying equation 15, the result is given by:

$[x + yy'] = -\mu[xy' - y] \qquad \text{Eq. 16.}$

It can be seen that equation 16 consists of terms including x, y, the coefficient of friction and the derivative of y with respect to x. Values of such terms which satisfy equation 16 result in a solution to equation 2. Such a solution produces zero moment about joint 20, neglecting bearing friction and spring torques. It was shown that for such a solution, the normal and frictional forces cancel out of the moment equation. Thus, no matter what the magnitude of the normal and frictional forces are, the amount of torque required to rotate the latch holder bar 14 is completely independent of these forces except for minimal bearing friction. Thus, the force required to slide open the latch 12 is determined merely by the selected holding spring force of spring 22. Equation 16 can be expressed as a first order differential equation.

$$x + yy' = -\mu xy' + \mu y = yy' + \mu xy' = \mu y - x = \qquad \text{Eq. 17}$$

$$(y + \mu x)y' = \mu y - x =$$

$$y' = \frac{(\mu y - x)}{(y + \mu x)} = \text{A first order differential equation}$$

The resulting first order nonlinear differential equation can be easily solved numerically. However, an explicit solution is possible by transforming the rectangular coordinate system into polar coordinates. Such a transformation is shown below:

$$\frac{dy}{dx} = \frac{(\mu y - x)}{(y + \mu x)} \qquad \text{Eq. 18}$$

$$= (y + \mu x)dy = (\mu y - x)dx \qquad \text{Eq. 19}$$

Polar coordinate values for x and y can be defined as:

$$x = r\cos(\theta) \quad y = r\sin(\theta)$$
$$\text{Thus, } dx = -r\sin(\theta)d\theta + \cos(\theta)dr \quad dy = r\cos(\theta)d\theta + \sin(\theta)dr$$

Making the substitutions into equation 19, $$(\mu x+y)dy=(\mu r\cos(\theta)+r\sin(\theta))(r\cos(\theta)d\theta+\sin(\theta)dr)$$

$$(\mu y-x)dx=(\mu r\sin(\theta)-r\cos(\theta))(-r\sin(\theta)d\theta+\cos(\theta)dr).$$

But since $(y+ux)dy=(uy-x)dx$, $$(\mu r\cos(\theta)+r\sin(\theta))(r\cos(\theta)d\theta)=(\mu r\sin(\theta)-r\cos(\theta))(-r\sin(\theta)d\theta+\cos(\theta).$$

Now, multiplying out the terms gives:

$$\mu r^2\cos^2(\theta)d\theta+\mu r\cos(\theta)\sin(\theta)dr+r^2\sin(\theta)\cos(\theta)d\theta+r\sin^2(\theta)=-\mu r^2\sin(\theta)d\theta+\mu r\sin(\theta)\cos(\theta)dr+r^2\sin(\theta)\cos(\theta)d\theta-r\cos^2(\theta)dr \quad \text{Eq. 20.}$$

Now, equation 20 can be simplified by canceling out similar terms and by using the identity shown below:

$$\cos^2(\theta)+\sin^2(\theta)=1.$$

The result becomes the simple expression:

$$\mu r^2 d\theta = -r\,dr \quad \text{Eq. 21.}$$

Dividing each side by "r" results in:

$$\mu r\, d\theta = -dr \text{ or dividing by } (\mu r) \text{ results in:} \quad \text{Eq. 22}$$

$$d\theta = -\frac{1}{\mu}\left[\frac{dr}{r}\right]$$

Now, by forming an integral of equation 22:

$$\int_{\theta_1}^{\theta_2} d\theta = -\frac{1}{\mu}\int_{r_1}^{r_2}\frac{dr}{r} \quad \text{Eq. 23}$$

Solving and evaluating the integral results in:

$$\theta_2-\theta_1 = -\frac{1}{\mu}\left[\frac{r_2}{r_1}\right] = -\mu(\theta_2-\theta_1) = \ln\left[\frac{r_2}{r_1}\right] \quad \text{Eq. 24}$$

Solving for "r2" in terms of the other values results in:

$$\exp^{-\mu(\theta_2-\theta_1)} = \frac{r_2}{r_1} \quad \text{Eq. 25}$$

$$r_2 = r_1 \exp^{-\mu(\theta_2-\theta_1)}$$

Equation 25 specifies the equation of curvature of sliding surface 26 that is required to achieve the objectives of the invention. Any "r1" at any "θ1" can be specified in equation 25, and the required "r2" at any "θ2" can then be found. The spiral expands from zero to infinity, with any portion of the curve being a valid solution to the curve that must be machined into the mechanism.

Equation 25 is a general solution allowing for the design of any constant triggering force release mechanism. Given any desired values of "θ1", "θ2", and "r", the required curvature for the sliding surface can be found by equation 25. Thus, many other variations of the quick release mechanism can be designed.

Equation 25 has been derived for the required curvature of the latch holder bar 14. Since the latch holder bar 14 and the latch bar 12 only touch in one point, either an equation of the curvature of the latch holder or an equation for the latch could be derived. In some cases, it may be desired to have this required curvature on the latch bar itself instead of on the latch holder. The derivation for the required curvature of the latch is done in the same manner and results in the same exponential spiral equation. Such a mechanism is merely an inversion of the first mechanism.

Figure 5:
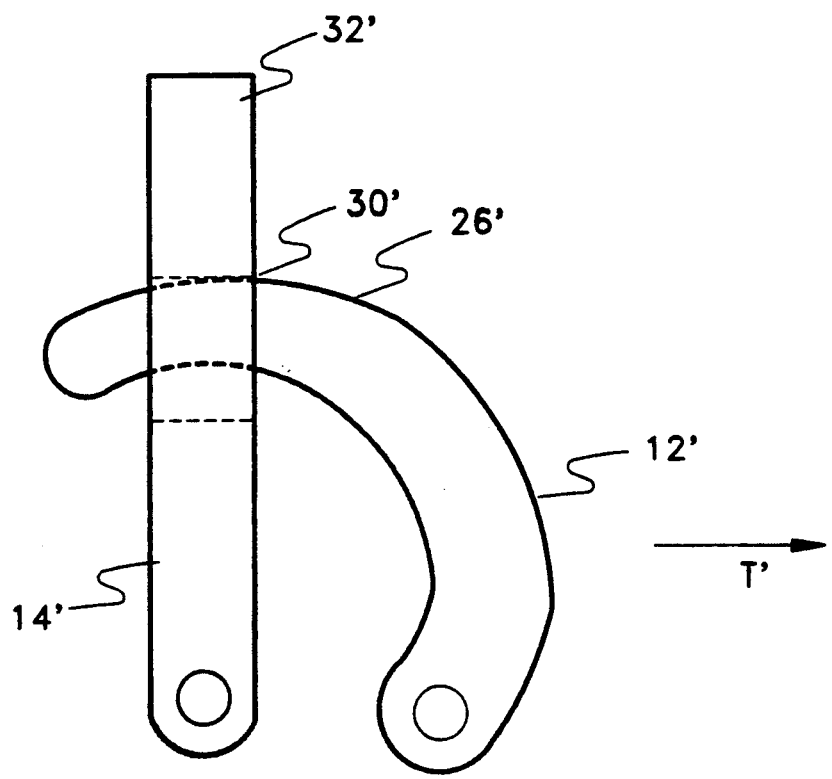
FIG. 5 is an alternative embodiment of the quick release mechanism in accordance with the invention.

FIG. 5 is a view of an alternative embodiment of the invention described above. In this embodiment, latch holder bar 14' again contacts latch bar 12' at point 30'. However, in this situation, equation 25 is used to determine sliding surface 26'. A spring (not shown) provides an initial torque on the latch holder 14'. Pushing on knob 32' causes latch holder 14' to slide off latch bar 12' on sliding surface 26' until latch bar 12' is free. Again, the release mechanism is independent of tension T'.

Referring to FIG. 4, release surface 34 of latch bar 12 must designed so that the rope or shackle (not shown) fastened around latch bar 12 around anchoring point 28 will easily slide off when latch bar 12 is released. A sharply curved surface will cause the rope or shackle to catch. Whiel a straight surface will permit easy release, the restriction of having a straight line as the only possible solution greatly restricts other design choices.

The derivation of the limiting curvature can be done in exactly the same manner as was done for the latch holder bar 14. Again, there are normal and frictional force vectors acting against a lever arm. In this case, however, it is desired to have the rope or ring slide and the lever rotate instead of being statically neutral as in the case of the previous design of the latch holder bar. For such a rotation to occur, the moment about the pivot must be greater than zero instead of equal to it. The resulting equation is:

$$r_2 = r_1 \exp^{-\mu(\theta_1-\theta_2)} \quad \text{Eq. 26.}$$

This is almost identical to equation 25 with the exception of a value of $(\theta_1-\theta_2)$ in the exponent instead of $(\theta_2-\theta_1)$. The reason for this discrepancy is that the convention used for measuring an angle "θ" is such that a positive angle proceeds from right to left. An angle proceeding from left to right is considered negative.

The orientation of the latch holder bar 14 in the previous derivation of equation 25 was opposite of that of the orientation of the latch 12. Thus, the two spirals spiral out opposite each other, but the angle "θ" is still measured from the same fixed axis of fixed orientation.

In equation 26, the coefficient of sliding friction, $\mu$, used for the determination of required curvature should be of a value which is higher than that actually expected. If the value of $\mu$ used is exactly equal to the actual value, a zero moment will result about the latch after it is triggered.

To ensure proper opening of the latch 12, it is desired that a positive moment 42 results. Such a positive moment 42 results when the actual value of $\mu$ is less than the designed value of $\mu$. If the actual value of $\mu$ is greater than the design value, the rope or shackle will not slide off the latch. The higher limit for the coefficient of friction for most materials is about 1.0. Therefore, if a design value of 1.5 were used for $\mu$, it is quite certain that any rope or shackle will easily slide off the latch when it is opened. Any curve with a curvature which lies between that of a straight line and that of equation 26 is a valid solution.

Again referring to FIG. 3, if it is desired to create a mechanism in which the triggering force increases at a desired rate as a function of tension, slight modifications can be made to the original derivation. Starting with the previous equation #1, the moment about joint 20 can be expressed again in equation 27 as:

Moment about joint
$$20 = (R \times F_S) + (D \times F_N) + (D \times F_f) \qquad \text{Eq. 27}$$

For example, suppose it is desired to have the required triggering force increase at a rate equal to one percent of the tension being restrained. An application where it may be desired to have the triggering force ramp up as a function of tension would be in a case such as automatically dropping a an object when it looses a certain amount of weight or when line tension decreases by a certain amount. Say a scientific instrument or perhaps a ballast bag is desired to be automatically dropped from a balloon when its weight decreases by a certain amount, or an object is being lowered to the ocean floor and it is desired to release it when it touches bottom. Now say that a release device is supporting the instrument and has been constructed to have a triggering force that increases as a function of loading. A spring can then be attached to the trigger so as to always apply a force which acts to always pull open the trigger. Initially, the heavier load causes the required triggering force to be greater than that supplied by the spring. However, as the instrument or object decreases in weight, or the lowered object touches the ocean floor, a loading is eventually reached whereas the force required to activate the trigger is equal to the force supplied by the spring. In such a case, the device will automatically trigger and release the instrument or object. The device described would be the inverse of a "weak link".

Another application where the mechanism would come into use would be that in which it is desired for the operator to have an approximate idea of the current line tension at that instant. For example, consider the releasing of a tow glider from behind a motorboat. If the operator releases a purely constant triggering force release, he may not have a feel for how much tension is actually on the line. If a thermal or other updraft is present, the operator could judge the tension by the "feel" of the triggering force and correspondingly lower the glider's nose immediately after the release to avoid a stall. Of course, the increase in triggering force would ramp up as a small percentage of line tension, still allowing a practical triggering force under even high loads. The design using the mathematical formula allows the increase in triggering force to ramp up as whatever may be desired instead of purely increasing a some fixed high rate as is the case with commercially available releases.

Another example where it may be advantageous to have the triggering force increase slightly as a function of tension would be in situations where the operator would be exposed to violent shaking or jerking as tension increased. For example, if an operator is in the back of a jeep over rough ground, or in a boat during rough seas, and an object is being towed, the faster the object is being pulled, the greater the line tension. Also, however, the faster the object is being pulled, the more shaking and bouncing the operator will be exposed to. If the triggering force remains constant regardless of tension, the operator may be bounced around during rough conditions and accidentally pull too hard on the release. A release which had a triggering force that increased slightly as a function of tension may be of use here. Equation 27 now becomes:

Moment about joint
$$20 = (R \times F_S) + (D \times F_N) + (D \times F_f) + (0.01 TL)k = 0 \qquad \text{Eq. 28}$$

where:
T = Tension being restrained
L = Distance from joint 20 to knob 32
R = Distance from joint 20 to spring contact point 52
$F_s$ = spring force 50
D = Distance from joint 20 to contact point 30
$F_n$ = force normal to point 30
$F_s$ = frictional force at point 30.

From equation 28, it can be seen that a zero moment results about joint 20 when a force of magnitude equal to 1 percent of the tension restrained is applied to the latch holder knob 22. As before, the last two terms of the moment equation depend on Fn and Fs which are related to the tension being restrained. The first term is merely the force exerted by the spring 22 and does not depend on tension T. Now, unlike the previous analysis, it is not desired to constrain the last two terms of equation 27 to always equal zero. Instead, in the case of designing a release mechanism in which the triggering force increases with tension, the sum of the last two terms, (D×Fn) and (D×Fs), should be equal to:

$$(D \times F_n) + (D \times F_f) = -(R \times F_s)k - (0.1TL)k \qquad \text{Eq. 29.}$$

Assuming that the moment caused by the retaining spring, (R×Fs), is small compared to the term )0.01 TL), equation 29 can be expressed as:

$$(D \times F_n) + (D \times F_f) = -(0.1TL)k \qquad \text{Eq. 30.}$$

Using equation 30 in place of equation 2, a similar procedure can be followed as before to arrive at the required curvature of the sliding surfaces. In this case, however, the geometry and dimensions of the mechanism become involved in the solution.

Basic equations for the variation of the invention in which the required triggering force decreases with tension and eventually releases automatically at a specific tension will now be expressed. Again, the derivation begins with the moment equation (eq. 1 or eq. 27) about joint 20 as shown below.

Moment about joint
$$20 = (R \times F_s) + (D \times F_n) + (D \times F_f) \qquad \text{Eq. 27.}$$

The performance required in this case is such that the device automatically triggers when a certain tension is reached. As an example, suppose it is desired to have the mechanism release when the tension reaches 500 pounds. When this tension is reached, it is desired that the moment required to rotate the latch holder becomes less than or equal to zero.

Moment about joint
$20 = (R \times F_s) + (D \times F_n) + (D \times F_f) = 0$ at tension of 500 lbs.  Eq. 31.

Equation 31 can now be used as a replacement of equation 2 and a similar derivation can be done to determine the required curvature equation. Again, the solution involves the specific dimensions and geometry of the mechanism.

The general equation of curvature required to be machined into the sliding surface of the "weak link" or inverse "weak link" can be found by equation 32 as shown below:

$$y' = \frac{[(px - wx)(ty) - (py - wy)(tx)](\mu y - x) + M_s(1 - \mu)(y - wy)}{[(px - wx)(ty) - (py - wy)(tx)](y + \mu x) - M_s(1 + \mu)(x - wx)}$$  Eq. 32

Assuming that the "x,y" origin lies directly on top of the latch holder joint 20, the variables can be defined as:
- $M_s$ = The constraint spring moment (measured in the positive k direction)
- px py = The x,y coordinates of anchor point 28 (the point of contact of the rope 2 or cable with the latch bar)
- wx,wy = The x,y coordinates of the latch pivot 18.
- tx,ty = The x,y components of tension T at the desired loading for release.
- $\mu$ = The coefficient of friction.

Equation 32 can be solved numerically to obtain the solution curve. The "weak link" version is created by implementing a holding spring 22 which exerts a moment that forces the latch holder 14 closed, while the inverse "weak line" version uses a holding spring which acts to force holder open. In case of the constant triggering force version, the required value of the holding spring moment $M_s$ becomes zero and equation 32 simplifies back into equation 17.

Applications for the device range from releasing heavy barges from tug boats, releasing gliders from tow planes, or releasing sails from sailboats. A quick release mechanism for use in sailboat rigging would be a typical application of the mechanism.

Certain components of the sailboat such as the sail or spinnaker are secured by lines to hold them in the desired position. In situations such as high winds and approaching reefs, it is desired to have the option of being able to quickly release these tensioned lines in order to reduce the effective force being produced by the sail. Usually, under the circumstances existing when it is desired to release such lines, the tension being carried is high and the amount of time to react is short. Current release mechanisms consist of devices which require the operator to pull out a load bearing pin or push back a spring-type lever such as manufactured by the Wichard Company. Unfortunately, the higher the load becomes, the harder it is to pull out this pin or push the lever. Usually, the operator must pull on the line to reduce tension being carried by the device before it can be released. There becomes a limit as to how much tension a person can reduce. Another commonly used option is the actual cutting of the line itself. A constant triggering force release mechanism would be a highly desired item for this application.

Preferably, the materials used should have a high strength to prevent breakage, a high modulus of elasticity to prevent deflection, and a good corrosion resistance and hardness to prevent damage to the sliding surfaces. The latch and latch holder can be fashioned from a wide variety of materials such as plastics, stainless steel, brass, chrome plated steel, etc. that fulfill a number of design requirements such as frictional properties, corrosion resistance, strength, deflection, for example. For the constant triggering force variation, it is desired to use materials which do not have a wide spread between the sliding and static coefficients of friction. Also, it is desired that the materials do not have a large spread between the coefficients of friction in the dry and the oiled states.

Contact forces between the sliding surfaces should be as small as possible to minimize wear of surfaces and size of materials needed. Further, the contact force as a function of latch rotation should be of such a function that the latch and latch holder surfaces wear away in a curve which follows a solution curve of equation 25. This will ensure that the device will always operate as intended. In the sailboat application, the surfaces will not wear significantly during the life of the device. Therefore, contact surfaces would not have to be designed to follow the solution curve.

The angle that the latch holder must be rotated in order to trigger the release should be a reasonable angle for the particular application. Clearly, a "hair trigger" requiring a rotation of one a degree or two would be too sensitive for the sailboat application. By the same reasoning, a rotation angle of 180 degrees would be too large. Experimentation showed that a rotation angle of about ten to twenty degrees is preferable. Thus, triggering of the device occurs only after the latch holder has been rotated the entire amount. If the latch is rotated only half way and then stopped, the mechanism will continue to hold as normal.

The device should be configurated so that it is both easy and convenient for the operator to load and trigger. The smaller the operating envelope, the better the configuration. The configuration shown in FIG. 1 is the preferred embodiment for use in a sailboat. Upon testing of a prototype, it was found that loading of the device was most convenient if the operator could close the device by pushing on the latch 12 only, without having to pull back the latch holder 14. In other words, the operator slides the rope or shackle onto the latch bar 12 into anchor point region 28. Then, the operator pushes the latch bar 12, and the latch holder 14 is forced to rotate by a cam action from surface 54 of the latch 12. A continued pushing on the latch 12 causes the latch holder 14 to rotate back, and then snap into place.

The distances which the latches swing away from the main body of the mechanism should be kept as small as possible to avoid possible interference with other equipment.

The material used for sliding surfaces should have a coefficient of friction which does not change significantly from the static to the sliding cases. Also, the coefficient should not change significantly between oiled and dry conditions.

As previously stated, it is preferable that the latch holder 14 be pulled through its entire pre-selected arc before releasing the latch 12. In most cases, the static coefficient of friction is higher than the sliding coefficient. If the curvature of the arc is designed using a static value of "$\mu$", once the latch holder is moved, the smaller sliding "$\mu$" will cause the latch holder to continue to move and eventually trigger itself. While such a device may be useful in some applications, it is not desired for this particular application. Therefore, the sliding "$\mu$" must be the coefficient used for the design. Given the criteria discussed above, the preferred choice for use in the given example is chrome plated steel.

An ideal material for this application would be one which had identical values of "$\mu$" for both the static and sliding cases. Teflon comes close to fitting this criteria. Another material such as chrome plated steel has a wider spread between "$\mu$" values, but is stronger, cheaper, and easier to implement.

If using a material such as chrome plated steel in which there is a slight difference between "$\mu$" static and "$\mu$" sliding, a design compromise must be made. If designing the required curvature for "$\mu$" sliding, initially pulling the latch holder 14 to overcome the larger "$\mu$" static will require a force which is dependent on the loading multiplied by the difference between "$\mu$" static and "$\mu$" sliding. If the spread between "$\mu$" coefficients is small, the increase in required triggering force as a function of tension will also be small. Such a small increase in required triggering force as a function of loading may even be desired so that the operator can judge how much tension is actually being released. Another solution is to use a curvature of "$\mu$" static for a very short distance, and then revert the curvature back to the solution using "$\mu$" sliding. Such a device will then always have an initial constant triggering force, and if rotation of the latch holder 14 is stopped half way, the mechanism will hold by itself. However, in order to again pull back the latch holder 14 from this half way position, a small triggering force such as with the previous case will be required.

Another coefficient of friction value which must be considered is that resulting from a dry or from an oiled surface. Again, it is desired that the material used has a "$\mu$" which is identical for both the dry and the oiled cases. Teflon again fits this criteria, but chrome plated steel also has an acceptable spread between these frictional values. For the design, it could be specified that a dry surface will always be present. However, in reality, an operator may eventually oil the surface of the part accidentally and the mechanism will not perform properly. Therefore, a "$\mu$" value for an oiled surface should be used. If "$\mu$" dry is larger than "$\mu$" oiled, the required triggering force for a dry surfaced latch will increase as a function of force multiplied by the difference between these coefficients. However, for a material such as teflon or chrome plated steel with a small change in friction coefficients, such an increase in required triggering forces is minimal.

The size and material distribution of the latches should be such that inertial forces from shocks or quick accelerations does not cause a moment which triggers the device. Preferably, the center of mass of latch 12 and latch holder 14 should be such that an equal moment is created during an acceleration so that latch holder 14 has substantially no tendency to slide free from latch 12 unless intentionally triggered.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A quick release mechanism for releasing two members under tension comprising:
    a housing having a releasable point of attachment for one said member;
    means for latching having a point of attachment for the other said member, with said means pivotally attached to said housing;
    means for releasing said means for latching, with said means for releasing pivotally attached to said housing, said means for releasing having a cam contact surface for engaging said means for latching, said contact surface dimensioned to provide a releasing force that is essentially constant despite the tension between said two members.

2. The quick release mechanism of claim 1 wherein said means for latching further comprises a member releasing surface for releasing said member releasably attached, said member releasing surface corresponding to said contact surface of said means for releasing.

3. The quick release mechanism of claim 2 wherein said means for latching further comprises a cam surface adapted to pivotally rotate against said means for releasing, such that said mechanism can be reloaded by exerting a force on said means for latching.

4. The quick release mechanism of claim 3 wherein the sliding coefficient of friction and the static coefficient of friction for both said means for latching and said means for releasing are substantially the same.

5. The quick release mechanism of claim 4 wherein the coefficient of friction for both said means for latching and said means for releasing remains substantially constant even in oiled conditions.

6. A quick release mechanism for releasing two members under tension comprising:
    a housing having a point of attachment for one said member;
    means for latching having a point of attachment for the other said member, with said means pivotally attached to said housing;
    means for releasing said means for latching, with said means pivotally attached to said housing;
    said means for latching further comprising a cam contact surface for engaging said means for releasing, said contact surface dimensioned to provide a releasing force that is essentially constant despite the tension between said two members.

7. The quick release mechanism of claim 6 wherein said means for latching further comprises a member releasing surface for releasing said member, said member releasing surface corresponding to said contact surface of said means for latching.

8. The quick release mechanism of claim 7 wherein said means for latching further comprises a cam surface adapted to pivotally rotate against said means for releasing, such that said mechanism can be reloaded by exerting a force only on said means for latching.

9. The quick release mechanism of claim 8 wherein the sliding coefficient of friction and the static coefficient of friction for both said means for latching and said means for releasing are substantially the same.

10. The quick release mechanism of claim 9 wherein the coefficient of friction for both said means for latching and said means for releasing remains substantially constant even in oiled conditions.

11. An apparatus for releasing a member subjected to a tensile force comprising:
    means for latching, adapted to releasably hold said member;

means for releasing, said means for releasing selectively engaging said means for latching;

sliding release surface, disposed between said means for latching and said means for releasing, said surface having a curvature in accordance with the equation:

$$r_2 = r_1 \exp^{-\mu(\theta_2 - \theta_1)}$$

where $\mu$ is the coefficient of friction and whereupon any specified radius $r_1$ at any angle $\theta_1$, a solution to the curvature will be found such that the releasing force that must be applied to said means for releasing in order disengage said means for latching is substantially independent of the tensile force being exerted on said member.

12. The apparatus of claim 11 wherein said sliding release surface is located on said means for latching.

13. The apparatus of claim 11 wherein said sliding release surface is located on said means for releasing.

14. A quick release mechanism for releasing two members under tension T, said mechanism having latch holder joint(20), anchor point(28), latch pivot(18), spring(22), latch holder(14) comprising:

at least one contact surface between two said members in accordance with the equation:

$$y' = \frac{[(px - wx)(ty) - (py - wy)(tx)](\mu y - x) + Ms(1 - \mu)(y - wy)}{[(px - wx)(ty) - (py - wy)(tx)](y + \mu x) - Ms(1 + \mu)(x - wx)}$$

where:

x,y origin is substantially coincident with latch holder joint (20)

Ms = the constraint spring moment (measured in the positive k direction);

px py = the x,y coordinates of anchor point (28), the point of contact of the cable with the latch bar;

wx,wy = the x,y coordinates of the latch pivot (18);

tx,ty = the x,y components of tension T at the desired loading for release;

$\mu$ = the coefficient of friction. T

* * * * *